United States Patent [19]

Noji et al.

[11] 4,437,011

[45] Mar. 13, 1984

[54] RADIATION EXCITED PHOSPHOR SCREEN AND METHOD FOR MANUFACTURING THE SAME

[75] Inventors: Takashi Noji, Odawara; Norio Hapao, Ayase; Yoshiharu Obata, Yokohama, all of Japan

[73] Assignee: Tokyo Shibaura Denki Kabushiki Kaisha, Kawasaki, Japan

[21] Appl. No.: 272,764

[22] Filed: Jun. 11, 1981

[30] Foreign Application Priority Data

Jun. 16, 1980 [JP] Japan .................................. 55/80146
Feb. 17, 1981 [JP] Japan .................................. 56/21934

[51] Int. Cl.[3] .................................................. G01J 1/58
[52] U.S. Cl. ................................ 250/486.1; 250/483.1
[58] Field of Search ............................ 250/483.1, 486.1

[56] References Cited

U.S. PATENT DOCUMENTS 3,769,059 10/1973 Driard et al. .................. 117/33.5 R
3,825,763 7/1974 Cornelis et al. ...................... 250/486
3,961,182 6/1976 Spicer .......................... 250/213 VT
4,023,039 5/1977 Galues et al. ..................... 250/486.1
4,069,355 1/1978 Lubowski et al. ............... 250/483.1
4,101,781 7/1978 Neukermans et al. ........... 250/483.1
4,184,077 1/1980 Washida et al. ................. 250/483.1
4,209,705 6/1980 Washida et al. ................. 250/486.1

OTHER PUBLICATIONS

"High Resolution Phosphor Screen for X-ray Image Intensifier", Washida et al., *Adv. in Electronics and Electron Physics*, vol. 52, 1979, pp. 201-207.

*Primary Examiner*—Bruce C. Anderson
*Attorney, Agent, or Firm*—Cushman, Darby & Cushman

[57] ABSTRACT

An input phosphor screen includes a substrate having a substantially smooth surface, and first and second phosphor layers both vapor-deposited sequentially on the substrate. The first layer is made of phosphor crystal particles having a mean diameter of 15 μm or less. The second layer has a thickness ten or more times that of the first layer and is made of individual columnar crystals of alkali halide grown vertically on the crystal particles, standing close together with fine spaces therebetween. A third layer is preferably deposited on the second layer as a continuous film. These three layers can be deposited by evaporating a phosphor material or materials at a prescribed temperature and at a predetermined degree of vacuum.

12 Claims, 6 Drawing Figures

RADIATION EXCITED PHOSPHOR SCREEN AND METHOD FOR MANUFACTURING THE SAME (I) Field of the Invention The present invention relates to a radiation excited phosphor screen and a method for manufacturing the same and, more particularly, to an input phosphor screen useful in an image tube and a method for manufacturing the same.

(II) Description of the Prior Art

As is well known, a radiation excited input phosphor screen used for an image tube, for example, an X-ray image intensifier, includes a substrate which transmits radiation and a phosphor layer formed on the substrate. A photoemissive layer is formed on the phosphor layer. This phosphor screen is arranged at the front side of the envelope which has a focusing electrode, an accelerating electrode and an output phosphor screen at the rear end. Radiation, for example, X-rays which have penetrated a subject and have been two-dimensionally modulated by the radiation absorptivity of the subject, penetrates from the front side of the envelope to the substrate of the input phosphor screen to excite the phosphor layer, thus converting the X-ray energy into light. This light is converted to photoelectrons by the photoemissive layer. These photoelectrons are focused by the focusing electrode as well as accelerated by the accelerating electrode to be radiated on an output phosphor screen where the photoelectron energy is reconverted to visible light to form an image of the subject thereon.

An input phosphor screen of a well-known X-ray image intensifier and a method for manufacturing the same are disclosed in Japanese Patent Disclosure No. 52-136560. According to this technique, fine grooves are formed on the surface of a substrate in advance, cesium iodide (CsI) phosphor is vapor-deposited on the substrate, and a phosphor layer having a light guide action with the fine cracks is formed. In additaion to this, another technique is known from Japanese Patent Disclosure No. 50-109662 according to which a layer of small glass balls of 20 to 70 μm diameter is formed on a substrate, and a phosphor layer is formed thereon to obtain the light guide action with fine channels (spaces) extending from the spaces between the glass balls. Japanese Patent Publication No. 55-19029 also shows a phosphor screen which has similar cracks. However, formation of grooves or three-dimensional patterns on the surface of the substrate is complex in procedure so that it is not preferable from the viewpoint of ease in manufacture. Furthermore, these grooves or glass balls do not act as a phosphor layer and results in low efficiency.

It is also known that a layer formed by vapor deposition of an alkali halide phosphor material such as CsI may easily form a needle-like crystal structure of a mean diameter of 2 μm or less wherein the needle-like crystals extend vertically with respect to the substrate. Although such a needle-like crystal structure itself has some light guide action, it alone cannot serve to sufficiently increase the resolution. Thus, it has been necessary to form island or columnar crystal mass structures with which fine spaces are formed. For this reason, in the three prior art techniques described above, several to several tens of needle-like crystals are bundled into an island or a column of 20 to 100 μm diameter utilizing cracks in the phosphor layer which extend vertically with respect to the substrate to provide an input phosphor screen of an X-ray image intensifier having light guide action. On the other hand, a technique is disclosed in Japanese Patent Disclosure No. 53-23266 according to which two phosphor layers formed by vapor deposition of CsI in a high vacuum are heat-treated at 350° C. for 30 minutes to grow columnar crystals to provide light guide action. This technique still calls for improvement since the temperature conditions for obtaining columnar crystals of suitable size in a stable manner require careful control. A phosphor screen of a plurality of layers of CsI each containing different activating agents in known in Japanese Patent Disclosure No. 52-23254. Although it relates to an output phosphor screen, a multilayer structure of porous phosphor layers and fine phosphor layers is also disclosed in Japanese Patent Disclosure No. 53-23265. However, this relates to a case of ZnS phosphor, and the structure is obtained by repeated heat treatment at 750° C. Thus, this technique cannot directly be applied to formation of a relatively thick vapor-deposited layer of a phosphor such as CsI.

It is, therefore, an object of the present invention to provide a radiation excited input phosphor screen and a method for manufacturing the same according to which an input phosphor screen may be manufactured without requiring the complex procedures of the prior art, and an input phosphor screen may be manufactured which has small quantum noise and which realizes excellent resolution and luminance, which have been impossible to achieve with the prior art techniques.

A phosphor screen of the present invention comprises a substrate with a substantially smooth surface, and a first phosphor layer and a second phosphor layer both vapor-deposited on the substrate. The first phosphor layer includes phosphor crystal particles having a mean diameter of 15 μm or less. The second phosphor layer is made of individual columnar crystals of alkali halide phosphor material grown vertically on the crystal particles with respect to the substrate, with fine spaces formed between the columnar crystals from the substrate to the top of the crystals. The second phosphor layer has a thickness which is ten or more times that of the first phosphor layer.

According to an aspect of the present invention, there is also provided a third phosphor layer on the second phosphor layer, which is vapor-deposited as a continuous layer having a thickness of 30 μm or less in such a manner as to seal the vertical fine spaces at their top portions between the columnar crystals.

With a phosphor screen of the present invention, each columnar crystal acts as a light guide, the total thickness of the phosphor layers may be made sufficiently thick without degrading the resolution, the quantum noise is low, and the luminance is excellent.

This invention can be more fully understood from the following detailed description when taken in conjunction with the accompanying drawings, in which.

Figure 1:
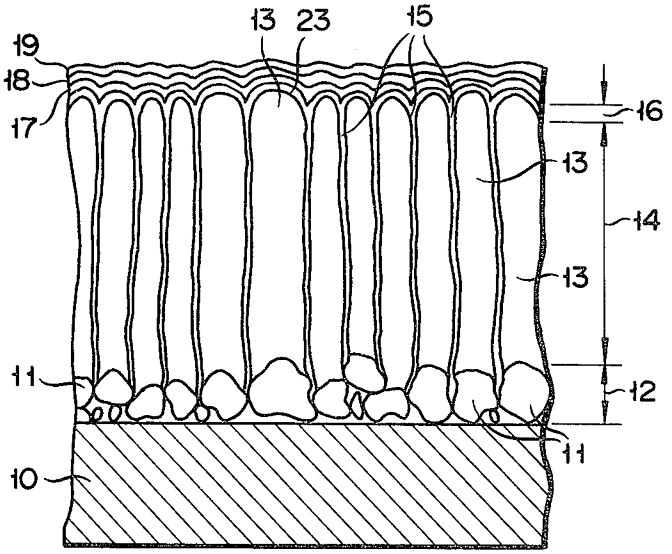
FIG. 1 is a schematic longitudinal sectional view of a phosphor screen according to the present invention.

An input phosphor screen of the present invention has a substrate 10, for example, an aluminum substrate which is easily penetrable by radiation such as X-rays and γ-rays and which has a smooth surface. The substrate 10 generally has a thickness of 0.3 to 1.5 mm. On the smooth surface of the substrate 10 is formed a first phosphor layer 12 of vapor-deposited crystal particles 11 of phosphor material having a mean size of 15 μm or less and generally at least 1 μm, shaped like gravel in one or two layers.

On the first phosphor layer 12 is formed a second phosphor layer 14 of individual columnar crystals 13 of alkali halide phosphor material such as CsI formed with the crystal particles 11 as seed crystals and tightly aligned on the projecting surface or surfaces of one or more of the particles. These columnar crystals 13 extend substantially vertically with respect to the surface of the substrate, and fine spaces 15 extending vertically with respect to the surface of the substrate are present between the adjacent columnar crystals 13 from the first phosphor layer to the tops of the crystals. The mean pitch of the columnar crystals 13 is generally 15 μm or less and usually at least 3 μm. The thickness of the layer 14 of mutually separated columnar crystals is 10 or more times and generally not more than 400 times that of the layer 12. The respective columnar crystals 13 generally have a diameter of 2 to 20 μm.

The crystal particles 11 and the columnar crystals 13 grown with the crystal particles 11 as seed crystals may appear to have a slight boundary between them. However, they have the same crystal structure, i.e., a monocrystal structure.

Radiation such as X-rays and γ-rays which becomes incident on the side of the substrate 10 is converted into light rays by the layers 12 and 14 both formed of phosphor material (that is, the layers 12 and 14 are excited by the radiation and emit light). As has been described hereinbefore, the columnar crystals 13 constituting the layer 14 are independent and separate from each other. Therefore, most of the emitted light is obtained in the direction along the columnar crystals 13, that is, in the substantially vertical direction with respect to the surface of the substrate 10 by total internal reflection within the columnar crystals according to the principles of fiber optics, thus experiencing substantially no transverse scattering. The columnar crystals respectively act as excellent light guides and greatly improve the resolution of the phosphor screen.

As has been already described, the second phosphor layer 14 is formed to a thickness (that is, the height of the columnar crystals 13) which is 10 or more times that of the first phosphor layer 12. The total thickness of the first phosphor layer 12 and the second phosphor layer 14 is usually 100 to 400 μm. When the total thickness exceeds 400 μm, the luminance is degraded since the radiation transmittance of the phosphor is lower than 100%. An input phosphor screen can be accomplished by depositing a photoemissive layer directly on the second layer 14, or by depositing a transparent conductive layer or a transparent protective layer on the layer 14 followed by the deposition of the photoemissive layer.

In accordance with the present invention, the phosphor layers may thus be made sufficiently thick. When the thicknesses of the phosphor layers are sufficiently great, the absorptivity of the radiation is improved, so that quantum noise may be reduced to the minimum and the luminance may be improved.

It is also necessary to form a photoemissive layer so that the energy of the light emitted by the phosphor layers may be converted to photoelectrons. Since the surface of the phosphor layer 14 has spaces between the columnar crystals 13, the photoemissive layer may sometimes be adhered so as to be separated at places. In such a case, electrons cannot be supplied uniformly throughout the surface of the photoemissive layer, resulting in distortion in the output image.

One solution to this problem of local separation of the photoemissive layer is shown in Japanese Patent Disclosure No. 49-76462 wherein a thick film of indium oxide (0.1 to 25 μm thickness) is formed on the surface of the CsI phosphor layer. However, practically, when there are small spaces of, for example, 1 μm between adjacent columnar crystals of a pitch 15 μm or less, it is almost impossible to form a film of indium oxide which allows supply of electrons uniformly through it according to experiments conducted by the inventors of the present invention. Furthermore, when the film of indium oxide is thick, metal indium remains within the film so that the transmittance of light is degraded and the sensitivity is also degraded. Even if electrons are supplied sufficiently, a photoemissive layer of good sensitivity is hard to obtain due to large three-dimensional patterns on the phosphor layer.

The inventors of the present invention have further made extensive studies in order to solve these problems. As a result, it was found that these problems may be solved by forming a third phosphor layer 16 on the second phosphor layer 14 into a continuous film so as to seal the fine spaces 15 at their top portions between the columnar crystals 13 as shown in FIG. 1. The layer 16 has a thickness of 30 μm or less and preferably at least 1 μm. Although the phosphor layer 16 emits light as in the case of the first phosphor layer 12 and the second phosphor layer 14, it has almost no light guide action. The main purpose of the layer 16 is to smooth the surface of the layer 14. Since the layer 16 may be so formed that its surface is continuous and smooth, the photoemissive layer or the like formed thereon may also be made continuous and relatively smooth. Accordingly, the supply of electrons throughout the phosphor screen during the tube operation, especially to the center of the phosphor screen, is not insufficient, and distortion of the image or degradation of the photoelectric conversion sensitivity due to three-dimensional patterns on the surface may be prevented.

When the third layer 16 has a mean thickness of 30 μm or more, the resolution is degraded. Conversely, when the third layer 16 is only as thick as 1 μm or less, three-dimensional patterns on the surface of the second phosphor layer 14 are directly transmitted, so that insufficient sensitivity or distortion of the output image may not be prevented.

A photoemissive layer 19 may be directly formed on the layer 16. However, in order to facilitate the supply of electrons and to eliminate distortion of the output image for the purpose of providing an input phosphor screen of high sensitivity and high resolution, it is also possible to vapor-deposit a transparent conductive layer 18 of, for example, indium oxide of a thickness of 5,000 Å or less and preferably about 2,000 to 2,500 Å on the layer 16. The photoemissive layer 19 is then formed thereon. If desired, a transparent protective layer 17 of, for example, aluminum oxide may be vapor-deposited to a thickness of 200 to 1,000 Å and preferably to a thickness of about 400 Å for preventing a reaction between the photoemissive layer 19 and the phosphor layer 16.

The layers 12, 14 and 16 may be made of different phosphor materials but are generally made of the same kind of alkali halide phosphor material, especially cesium iodide.

For manufacturing the input phosphor screen of the present invention as described above, a vapor deposition device as shown in FIG. 2 may be conveniently employed.

This vapor deposition device has a vacuum chamber 20, a vacuum chamber base plate 21, and an evacuating outlet 22 formed at part thereof. Inside the vacuum chamber 20 is arranged a boat 23 for holding and heating an evaporation source 24 which is filled in the boat 23. The substrate 10 is arranged above the open end of the boat 23, and phosphor material is evaporated on this substrate to form a phosphor layer A. A substrate heater 25 is arranged to cover the top surface of the substrate 10. A detector 26 for controlling the thickness of the phosphor layer is arranged in juxtaposition with the substrate 10. A vacuum gauge 28 and a pipe 29 for introducing gas are arranged to extend through the vacuum chamber base plate 21. A variable leak valve 30 for controlling the flow of a small amount of gas is incorporated in a gas supply pipe 29.

Figure 2:
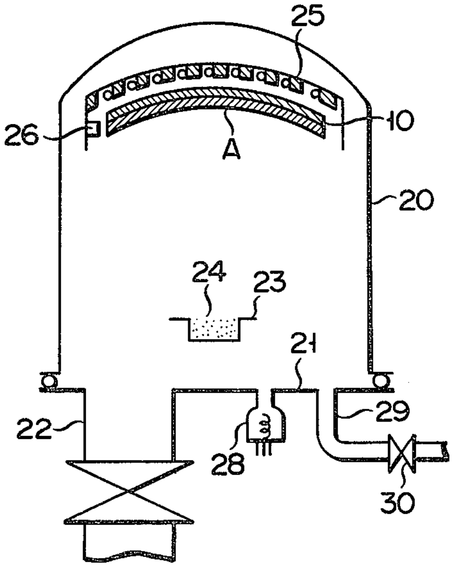
FIG. 2 is a schematic view of a vapor deposition device used for manufacturing a phosphor screen according to the present invention.

A preferable method for vapor-depositing cesium iodide to form a phosphor layer to be used in an input phosphor screen of an X-ray image intensifier using the device shown in FIG. 2 will be described. The vacuum chamber 20 is evacuated to $1\times10^{-7}$ Torr. The substrate 10 is heated to 300° to 500° C. by the heater 25 to clean the surface of the substrate 10. The temperature of the substrate 10 is then set at 20° to 150° C., for example at 100° C., by the heater 25. The variable leak valve 30 is opened to introduce an inert gas such as Ar gas to a pressure of $1\times10^{-3}$ to $1\times10^{-2}$ Torr, for example, to $5\times10^{-3}$ Torr. Under this condition, a current is passed through the boat 23 to evaporate the phosphor material 24 filled in the boat 23, for example, cesium iodide containing $1\times10^{-3}$ mol % of an activating agent such as TlI or NaI. Evaporation is terminated when one or two layers of crystal particles of cesium iodide are deposited like gravel on the substrate 10. The evaporating atmosphere preferably does not contain moisture.

Figure 3:
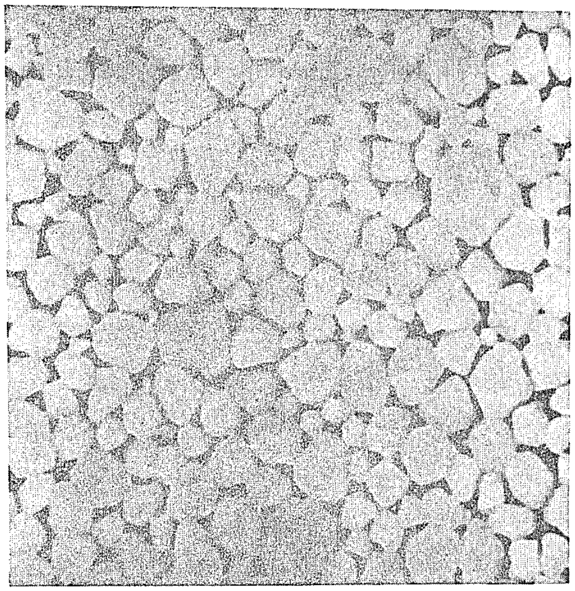
FIG. 3 is a photograph taken with a scanning electron microscope of the surface of a first phosphor layer of a phosphor screen according to the present invention.

A photograph of the surface of the first phosphor layer thus obtained taken with a scanning electron microscope (magnification: 1,000 times) is shown in FIG. 3. The layer in the photograph was obtained by using CsI as an evaporation source, at a substrate temperature of 100° C., at a degree of vacuum of $5\times10^{-3}$ Torr, and in an Ar atmosphere. The mean pitch of the adjacent projections is about 7 μm. The phosphor crystal particles are distributed with a diameter of about 1.5 μm to 20 μm, the mean diameter being about 7 μm. These particles are formed in one or two layers.

In the next step, the variable leak valve 30 is slightly closed to maintain the vacuum chamber 20 at a degree of vacuum of $1\times10^{-4}$ to $1\times10^{-2}$ Torr, for example, at $8\times10^{-4}$ Torr. The substrate is set at a temperature of 20° to 150° C., for example, at 100° C. Thereafter, a current is passed through the boat 23 to form the phosphor layer 24 by vapor deposition to a thickness of, for example, about 250 μm. By this vapor deposition, the second phosphor layer 14 of separate columnar crystals of a mean pitch of 15 μm or less are formed with the projecting portions of the first phosphor layer 12 acting as seed crystals.

Figure 4:
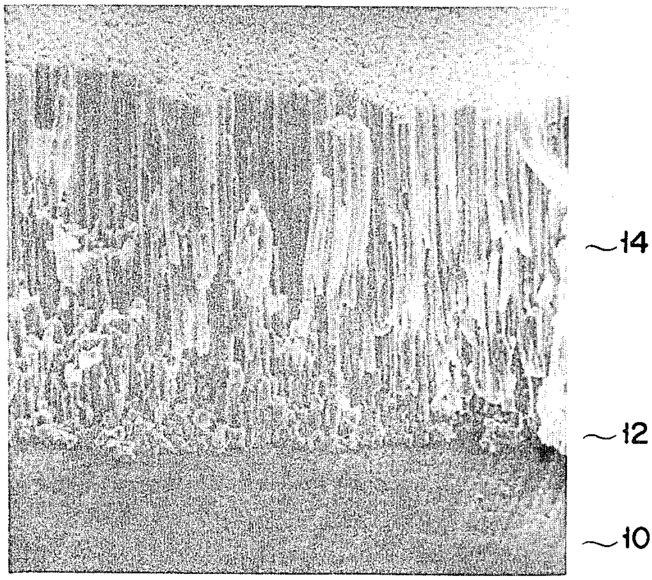
FIG. 4 is a photograph taken with a scanning electron microscope of a perspective section of a second phosphor layer formed on the first phosphor layer of a phosphor screen according to the present invention.
Figure 5:
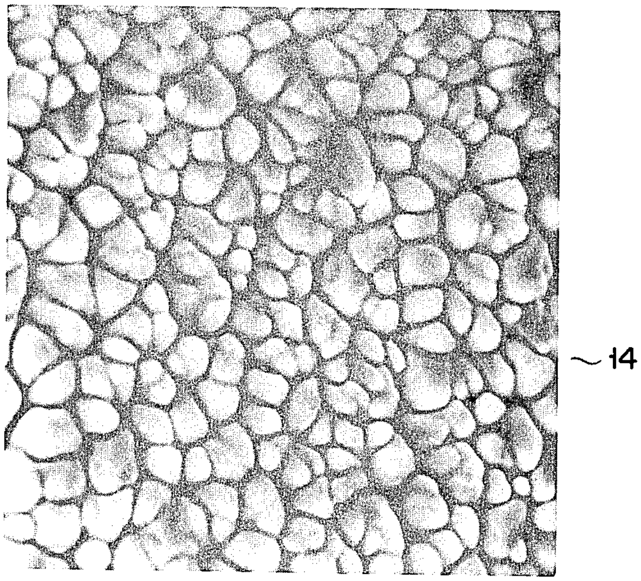
FIG. 5 is a photograph taken with a scanning electron microscope of the surface of the second phosphor layer of a phosphor screen according to the present invention.

FIGS. 4 and 5 are photographs taken with a scanning electron microscope of the second phosphor layer 14 of cesium iodide phosphor material formed to a thickness of 230 μm on the first phosphor layer 12 shown in FIG. 3 at a substrate temperature of 100° C., at a degree of vacuum of $8\times10^{-4}$ Torr, and in an Ar atmosphere (FIG. 4 is a partially sectional perspective view at a magnification of 300 times, and FIG. 5 is a plan view at a magnification of 1,000 times). It is seen from these photographs that phosphor columnar crystals are grown orderly to their tops. The mean diameter of the phosphor columnar crystal masses is about 7 μm (fluctuates within the range of 2 to 20 μm). These phosphor columnar crystals are seen to be arranged at a relatively high density standing close together with extremely small spaces therebetween. Furthermore, the enormous number of cracks formed in the big columnar or island bundles of several to several tens of crystals as obtained with the prior art technique is not seen.

The first layer 12 and the second layer 14 may be continuously formed by vacuum evaporation. In this case, the degree of vacuum in the chamber 20 is set at, for example, $1\times10^{-3}$ Torr and the boat temperature is gradually elevated. The crystal structures as shown in FIGS. 3, 4 and 5 are also sequentially obtained in this case.

After forming the first phosphor layer 12 and the second phosphor layer 14 in the manner described above, the variable leak valve 30 of the vapor deposition device is completely closed to maintain the pressure of the vacuum chamber 20 at a high vacuum of $1\times10^{-5}$ Torr or less, and preferably at $1\times10^{-2}$ Torr or less. The temperature of the substrate 10 is set within a range of 100° to 350° C. by the substrate heater 25 to evaporate the cessium iodide evaporation source 24 inside the boat 23. The third phosphor layer 16 is formed in this vacuum such that its means thickness is 1 to 30 μm, and preferably about 15 μm. In general, for forming the third phosphor layer 16 to be relatively thin, such as 5 μm or less, the temperature of the substrate 10 is preferably set to be high, about 300° C., for example. Conversely, for forming the third phosphor layer 16 to be thick, such as 30 μm, the temperature of the substrate 10 is preferably set to be low, for example, 100° C.

Figure 6:
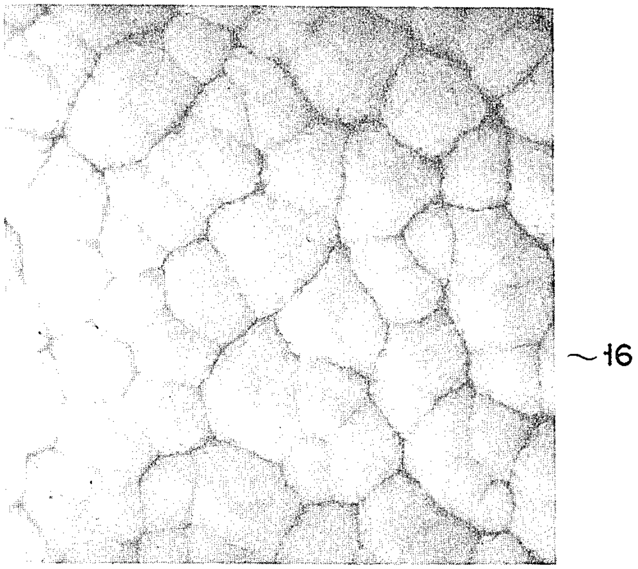
FIG. 6 is a photograph taken with a scanning electron microscope of the surface of a third phosphor layer of a phosphor screen according to the present invention.

FIG. 6 shows the surface (magnification: 3,000 times) of the third phosphor layer 16 of cesium iodide. It is seen from this FIGURE that the third phosphor layer 16 seals the tops of the fine spaces or fine channels between the respective columnar crystals and provides a continuous and relatively smooth surface.

For forming the conductive layer 18 and the protective layer 17, as in the above example, on the third layer 16, the substrate is taken out of the vacuum chamber 20 after the first to third layers are formed. With another vacuum chamber, the conductive layer 18 of indium oxide of a thickness of 5,000 Å or less is formed directly on the third phosphor layer 16 or through the protective layer 17 of aluminum oxide of a thickness of 200 to 1,000 Å.

The substrate having the input phosphor layers thus formed is assembled into an X-ray image intensifier, and a photoemissive layer is formed.

In the examples of the present invention which have been described above, the evaporation source for the first to third phosphor layers 12, 14 and 16 was cesium iodide filled in one boat 23. However, when different evaporation sources are used, a plurality of boats may be used which are sequentially heated for forming these layers.

Figure 7:
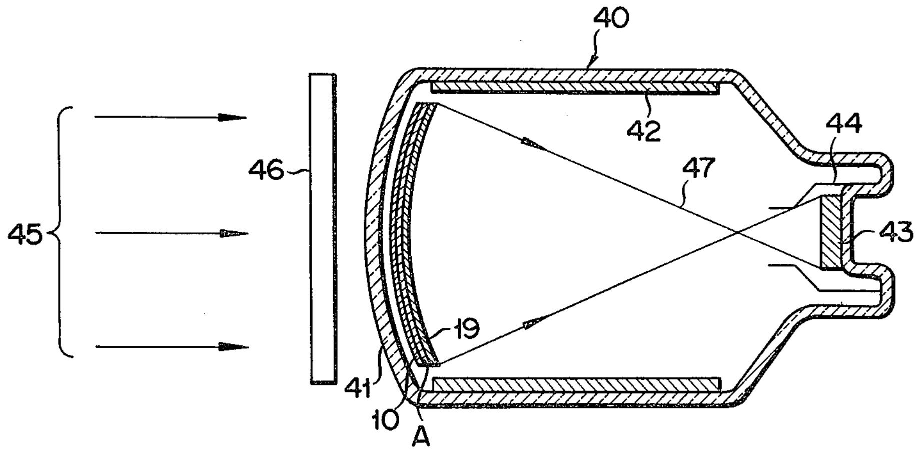
FIG. 7 is a view showing the construction of an X-ray image intensifier.

FIG. 7 shows the construction of an X-ray image intensifier incorporating the phosphor screen of the present invention. This intensifier includes an evacuated envelope 40 of, for example, glass, which has a convex front side 41. In this vacuum envelope 40 is arranged a phosphor screen of the present invention comprising the substrate 10, the phosphor layer A, and the photoemissive layer 19 in such a manner that the substrate 10 is close to and faces the inner concave wall surface of the front side 41. The substrate 10 is shown as a curved substrate having a predetermined radius of curvature. A focusing electrode 42 is attached to the inner wall of the cylindrical body of the envelope 40. An output screen 43 is arranged in opposition to the input phosphor screen, and an accelerating electrode 44 is arranged to enclose or surround the output phosphor screen 43.

The X-ray image intensifier of this construction operates and may be used in the following manner. X-rays 45 are irradiated on a subject 46 in front of the envelope and are modulated two-dimentionally by the absorptivity of the subject 46. The modulated X-rays penetrate the front side of the envelope 40 and impinge on the input phosphor screen. The X-rays which have penetrated the substrate 10 cause the phosphor layer A to emit light, thus converting the X-rays into light. The emitted light is converted into photoelectrons 47 by the photoemissive layer. The photoelectrons 47 are focused by the focusing electrode 42 while being accelerated to 25 to 30 kV by the accelerating electrode 44. The energy of the photoelectrons 47 is then reconverted to visible light by the output phosphor screen 43 to form an image thereon. The image obtained at the output phosphor screen 43 is several times brighter than that obtained by the phosphor layer A of the input phosphor screen.

Figure 8:
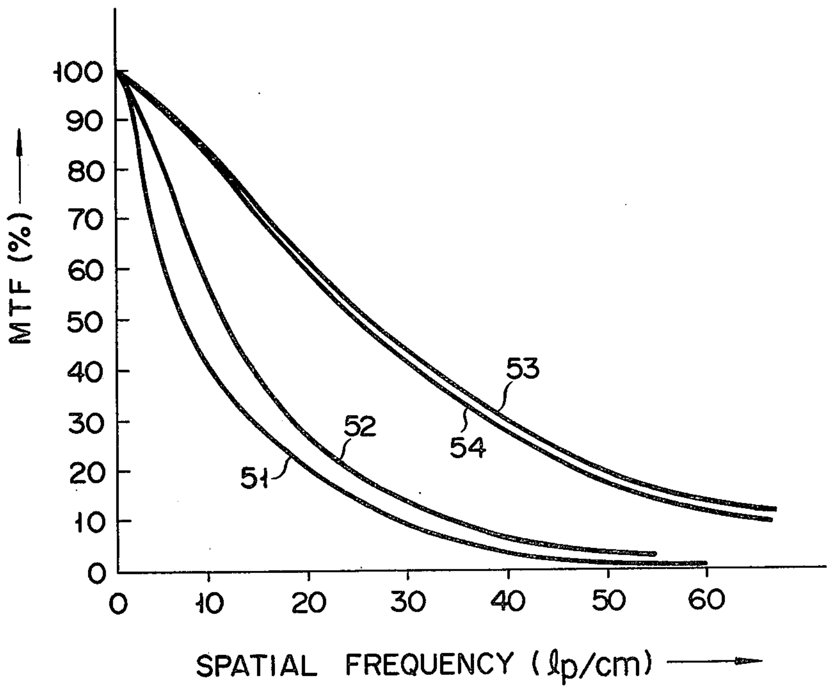
FIG. 8 is a graph showing resolution characteristics of phosphor screens according to the present invention together with those of prior art phosphor screens.

FIG. 8 shows measurements of the spatial modulation transfer function (MTF) indicating the resolution of various types of input phosphor screens using cesium iodide and manufactured according to the present invention or conventional methods. Curve 51 in the graph shows the case of a conventional structure wherein a CsI evaporated layer of 150 μm thickness is formed on the surface of a smooth substrate. Curve 52 shows the case wherein a CsI layer of 180 μm thickness is formed on a substrate of an aluminum oxide mozaic pattern as shown in Japanese Patent Disclosure No. 52-136560. Curve 53 represents the characteristics of the input phosphor screen of the present invention when the third phosphor layer 16 is not included. Curve 54 represents the characteristics of the input phosphor screen of the present invention when the layer 16 is formed. It is seen from this graph that the phosphor screen of the present invention is far improved over the conventional phosphor screens. Furthermore, a phosphor screen which does not cause distortion in the image and which provides excellent resolution is obtainable according to the present invention.

Although the present invention is capable of realizing excellent resolution, especially when applied to the input phosphor screen of an X-ray image intensifier, it is to be understood that the present invention is not limited to this particular application but may be applied to other radiation excited phosphor screens manufactured by vapor deposition.

What we claim is:

1. A radiation excited input phosphor screen comprising:
   - a substrate having a substantially smooth surface;
   - a first phosphor layer vapor-deposited on said smooth surface of said substrate and including phosphor crystal particles having mean diameter of 15 μm or less; and
   - a second phosphor layer of alkali halide phosphor material vapor-deposited on said first phosphor layer and including individual columnar crystals grown substantially vertically with respect to said smooth surface of said substrate, said columnar crystals standing close together with fine spaces therebetween, said second phosphor layer having a thickness ten or more times that of said first phosphor layer.

2. A phosphor screen according to claim 1, wherein said first phosphor layer and said second phosphor layer are made of the same kind of alkali halide phosphor material.

3. A phosphor screen according to claim 2, wherein said alkali halide phosphor material is cesium halide.

4. A phosphor screen according to claim 3, wherein the total thickness of said first and second phosphor layers is 100 to 400 μm.

5. A phosphor screen according any one of claims 1 to 4, further comprising a third phosphor layer which is vapor-deposited to a thickness of 30 μm or less on said second phosphor layer in such a manner as to be continuous and to seal said fine spaces between said columnar crystals at the tops thereof.

6. A phosphor screen according to claim 5, wherein said third phosphor layer is made of an alkali halide phosphor material.

7. A phosphor screen according to claim 6, wherein said alkali halide phosphor material is cesium iodide.

8. A phosphor screen according to claim 7, further comprising a transparent conductive layer vapor deposited on said third phosphor layer to a thickness of 5,000 Å or less.

9. A phosphor screen according to claim 8, wherein said transparent conductive layer is made of indium oxide.

10. A phosphor screen according to claim 9, further comprising a protective layer vapor-deposited between said third phosphor layer and said transparent conductive layer to a thickness of 200 to 1,000 Å.

11. A phosphor screen according to claim 10, wherein said protective layer is made of aluminum oxide.

12. A phosphor screen according to claim 11, further comprising a photoemissive layer on said conductive layer.

* * * * *